United States Patent
Shin et al.

(10) Patent No.: US 11,263,847 B2
(45) Date of Patent: Mar. 1, 2022

(54) DOOR LOCK APPARATUS, ELECTRONIC DEVICE, METHOD FOR UNLOCKING DIGITAL DOOR LOCK APPARATUS BY USING ELECTRONIC DEVICE

(71) Applicant: Samsung Electronics Co., Ltd., Suwon-si (KR)

(72) Inventors: Jaeyoung Shin, Yongin-si (KR); Jungsik Park, Suwon-si (KR); Sehwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 16/473,414

(22) PCT Filed: Dec. 27, 2017

(86) PCT No.: PCT/KR2017/015575
§ 371 (c)(1),
(2) Date: Jun. 25, 2019

(87) PCT Pub. No.: WO2018/124741
PCT Pub. Date: Jul. 5, 2018

(65) Prior Publication Data
US 2020/0143611 A1    May 7, 2020

(30) Foreign Application Priority Data
Dec. 27, 2016    (KR) ........................ 10-2016-0179875

(51) Int. Cl.
*G07C 9/00* (2020.01)
*E05B 47/00* (2006.01)
(Continued)

(52) U.S. Cl.
CPC ........ *G07C 9/0073* (2013.01); *E05B 47/0002* (2013.01); *G06Q 20/341* (2013.01);
(Continued)

(58) Field of Classification Search
CPC .............. G07C 9/0073; G07C 9/00309; G07C 2009/00373; G07C 2009/00777;
(Continued)

(56) References Cited

U.S. PATENT DOCUMENTS 6,535,136 B1    3/2003  Rodenbeck et al.
8,354,914 B2 *  1/2013  Buckingham .......... E05B 47/00
                                                    340/5.6
(Continued)

FOREIGN PATENT DOCUMENTS

KR    10-2005-0088860 A    9/2005
KR    10-1031490 B1         4/2011
(Continued)

OTHER PUBLICATIONS

KR20150131753A_translation—A method for providing a service unlocking door—Lee Hyo Seop et al. (Nov. 25, 2015). Translation to English by Espacenet KR20150131753A.*

*Primary Examiner* — Nam V Nguyen
(74) *Attorney, Agent, or Firm* — Jefferson IP Law, LLP

(57) ABSTRACT

An electronic device according to various embodiments of the present invention may comprise: a wireless communication interface; a display; a magnetic stripe transmission (MST) module comprising a coil for inducing generation of a magnetic field; a processor electrically connected to the wireless communication interface, the display, and the MST module; and a memory electrically connected to the processor, wherein the memory stores instructions for controlling the processor, the instructions, when executed, causing the processor to: receive digital card key information for unlocking a door lock apparatus from an external device through the wireless communication interface; convert the digital card information into an MST signal containing the same; activate the MST module in response to an MST module activation request input thereto; and unlock the door (Continued)

lock apparatus by transmitting the converted MST signal through magnetic induction and waking up the door lock apparatus through the transmitted MST signal. Other embodiments are also possible.

11 Claims, 12 Drawing Sheets

(51) Int. Cl.
*G06Q 20/34* (2012.01)
*G06Q 20/40* (2012.01)
(52) U.S. Cl.
CPC .......... *G06Q 20/352* (2013.01); *G06Q 20/40* (2013.01); *G07C 9/00309* (2013.01); *G07C 2009/00373* (2013.01)
(58) Field of Classification Search
CPC ... G07C 9/00722; G07C 9/00; E05B 47/0002; E05B 2047/0095; G06Q 20/341; G06Q 20/352; G06Q 20/40; G06Q 20/327
USPC .............. 340/5.72; 455/456.4, 456.1; 70/276
See application file for complete search history.

(56) References Cited

U.S. PATENT DOCUMENTS

| | | | | |
|---|---|---|---|---|
| 8,474,710 B2 * | 7/2013 | Marcinowski | ... | G06K 19/07345 235/382 |
| 8,628,012 B1 * | 1/2014 | Wallner | ................. | G06K 7/08 235/449 |
| 9,531,721 B2 * | 12/2016 | Neafsey | .............. | H04L 63/0428 |
| 9,582,949 B2 * | 2/2017 | Brown | ............... | G07C 9/00896 |
| 9,617,757 B2 * | 4/2017 | Lowder | ............... | E05B 17/2084 |
| 9,761,928 B2 * | 9/2017 | Han | ......................... | H01Q 9/04 |
| 9,947,160 B2 * | 4/2018 | Bowie | ............... | G07C 9/00857 |
| 10,171,974 B2 * | 1/2019 | Ahearn | .............. | G07C 9/00571 |
| 10,204,464 B2 * | 2/2019 | Eberwine | ............... | H04L 63/10 |
| 10,540,835 B2 * | 1/2020 | Kuenzi | .................... | G07C 9/29 |
| 10,651,897 B2 * | 5/2020 | Lee | ...................... | H04B 5/0031 |
| 10,846,695 B2 * | 11/2020 | Kim | ..................... | G06Q 20/327 |
| 2005/0107093 A1 * | 5/2005 | Dowling | ........... | H04M 1/72463 455/456.4 |
| 2012/0025948 A1 | 2/2012 | Lakamraju et al. | | |
| 2012/0280035 A1 * | 11/2012 | Liu | ........................ | G06Q 20/02 235/380 |
| 2014/0049370 A1 * | 2/2014 | Eberwine | ........... | G07C 9/00174 340/5.61 |
| 2014/0246490 A1 | 9/2014 | Graylin | | |
| 2015/0358315 A1 * | 12/2015 | Cronin | .................. | H04W 12/06 726/6 |
| 2017/0068953 A1 * | 3/2017 | Kim | ..................... | G06Q 20/382 |
| 2017/0185991 A1 * | 6/2017 | Park | ..................... | H04W 4/023 |

FOREIGN PATENT DOCUMENTS

| | | |
|---|---|---|
| KR | 10-1211477 B1 | 12/2012 |
| KR | 10-2015-0131753 A | 11/2015 |
| KR | 10-2016-0071468 A | 6/2016 |

* cited by examiner

FIG. 7
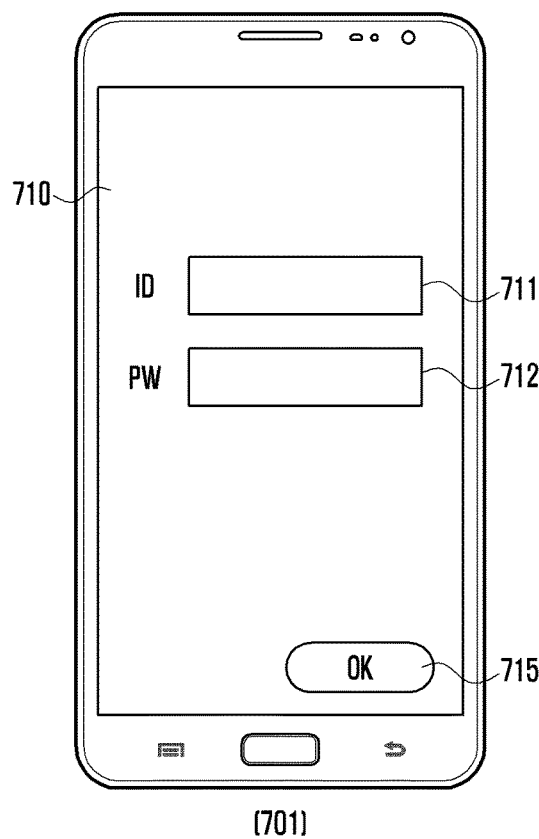
(701)
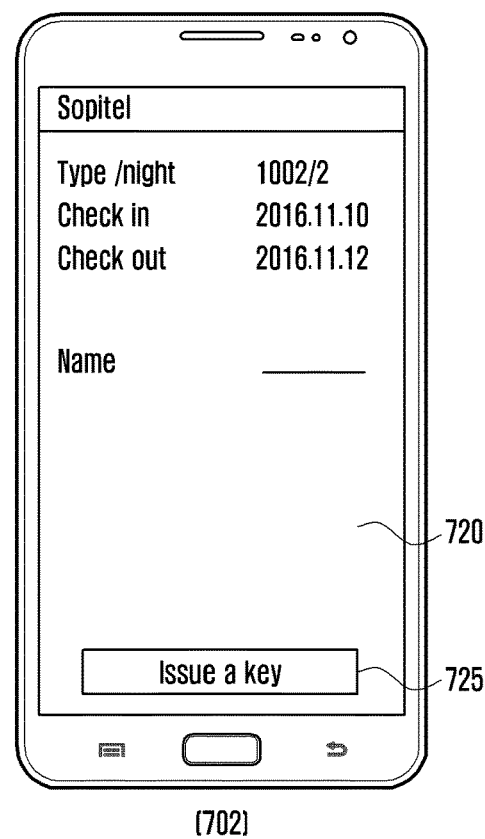
(702)
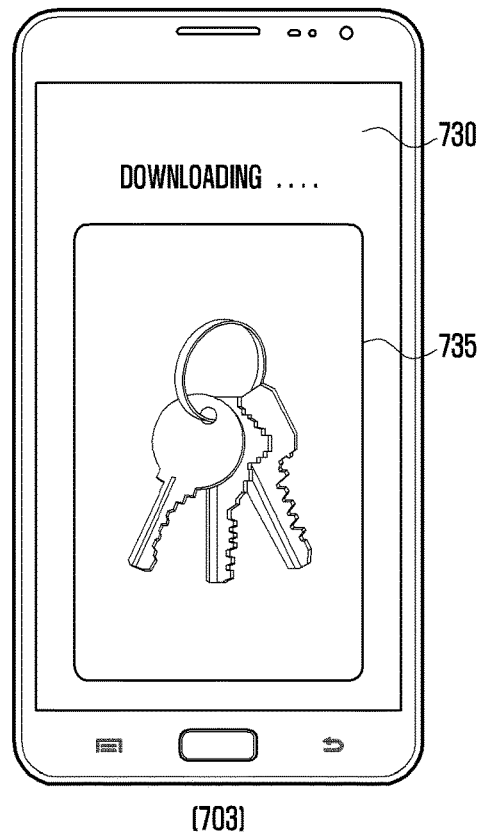
(703)
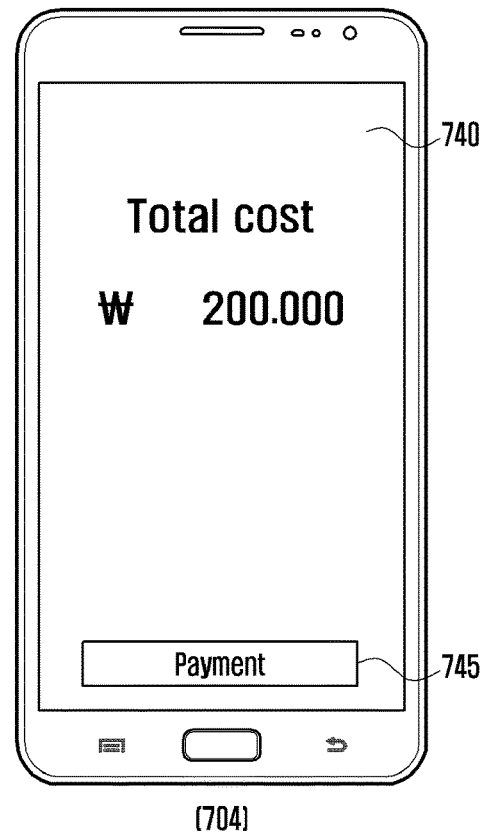
(704)

FIG. 10

DOOR LOCK APPARATUS, ELECTRONIC DEVICE, METHOD FOR UNLOCKING DIGITAL DOOR LOCK APPARATUS BY USING ELECTRONIC DEVICE

TECHNICAL FIELD

The disclosure relates to a door lock apparatus, an electronic device, and a method for unlocking a digital door lock apparatus using the electronic device.

BACKGROUND ART

In recent years, to restrict access by unauthorized outsiders in various places, digital door lock apparatuses using electromagnetic technology have been widely used in addition to mechanical access control systems using physical keys. As a door lock apparatus triggered by a magnetic stripe card is driven by a battery without a separate power source, it is necessary to maximize the usage time while minimizing current consumption of the battery. Such a door lock apparatus includes a physical trigger mechanism that controls the door to operate only when a magnetic card is inserted or swiped and not to operate when a magnetic card is not inserted. The physical trigger mechanism may be a reed switch sensing a magnetic field or a toggle switch responding to a push action. The physical trigger mechanism is used to wake up the door lock apparatus from the sleep mode by unlocking it through physical triggering.

DISCLOSURE OF INVENTION

Technical Problem

Accordingly, the disclosure is to provide a method and an apparatus that can utilize a door lock apparatus being physically triggered through a magnetic stripe card and a user's electronic device such as a smartphone as an access control system.

Solution to Problem

According to an embodiment of the disclosure, there is provided an electronic device. The electronic device may include: a wireless communication interface; a display; a magnetic stripe transmission (MST) module including a coil to induce magnetic field generation; a processor electrically connected with the wireless communication interface, the display, and the MST module; and a memory electrically connected to the processor, wherein the memory may store instructions that, when executed, cause the processor to: receive digital card key information for unlocking a door lock apparatus from an external device through the wireless communication interface; convert the digital card key information into an MST signal; activate the MST module in response to an activation request; transmit the converted MST signal through magnetic field induction; and unlock the door lock apparatus by waking up the door lock apparatus through the transmitted MST signal.

According to an embodiment of the disclosure, there is provided a digital door lock apparatus. The digital door lock apparatus may include: a trigger circuit configured to cause physical triggering by a magnetic card; an MST receiver circuit configured to receive an MST signal; a low-power processor including a wakeup circuit electrically connected to the MST receiver circuit and the trigger circuit; and a memory, wherein the memory may store instructions that cause the low-power processor to control: receiving an MST signal transmitted by an electronic device through the MST receiver circuit; activating the wakeup circuit in response to electrical triggering caused by reception of the MST signal; and determining whether the received MST signal is data for unlocking the door lock apparatus to unlock the door lock apparatus.

According to an embodiment of the disclosure, there is provided a method for unlocking a digital door lock apparatus using an electronic device. The method may include: transmitting a request for digital card key information for unlocking the door lock apparatus to an external device; receiving digital card key information related to access authorization in response to the request; detecting an activation request for an MST module; converting the digital card key information into an MST signal; and transmitting the MST signal to the outside through magnetic field induction according to activation of the MST module, wherein the MST signal may be delivered to the door lock apparatus and wake up the door lock apparatus.

Advantageous Effects of Invention

According to an embodiment of the disclosure, a door lock apparatus being physically triggered by a magnetic card can be utilized as an access control system that is operated by electrical triggering through the MST technology without the need for separate lock replacement and communication infrastructure. Thereby, it is possible to construct a convenient access control system by using existing facilities. Also, it is not necessary to deal with issues such as issuing and returning magnetic cards, enabling construction of a more efficient security system.

BRIEF DESCRIPTION OF DRAWINGS

FIGS. 7 and 8 are representations of the user interface of the electronic device according to an embodiment of the disclosure.

FIGS. 9 to 11 show examples of data in an MST signal according to an embodiment of the disclosure.

MODE FOR THE INVENTION

Hereinafter, various embodiments of the disclosure are described with reference to the accompanying drawings. It should be appreciated that the present disclosure is not limited to a specific embodiment and all modifications, equivalents, and/or alternatives thereof also belong to the scope of the present disclosure. The same or similar reference symbols are used throughout the drawings to refer to the same or like parts. In the description, the singular forms "a", "an" and "the" are intended to include the plural forms as well, unless the context clearly indicates otherwise. The expression "A or B" or "at least one of A and/or B" may indicate all possible combinations of A and B. The terms "first" and "second" may refer to various elements regardless of importance and/or order and are used to distinguish one element from another element without limitation. It will be understood that when an element (e.g., first element) is referred to as being (operatively or communicatively) "coupled with/to" or "connected with/to" another element (e.g., second element), it can be coupled or connected with/to the other element directly or via a third element.

In the description, the phrase "configured (or set) to" may be used interchangeably with the phrase "suitable for", "having the capacity to", "designed to", "adapted to", "made to" or "capable of" depending on circumstances. In some situations, the phrase "configured to" may mean that a device can perform a specific operation together with other devices or parts. For example, the phrase "processor configured to perform A, B, and C" may mean a dedicated processor (e.g., embedded processor) for performing the operations or a general-purpose processor (e.g., central processing unit (CPU) or application processor) that may perform the operations by executing one or more software programs stored in a memory unit.

Figure 1:
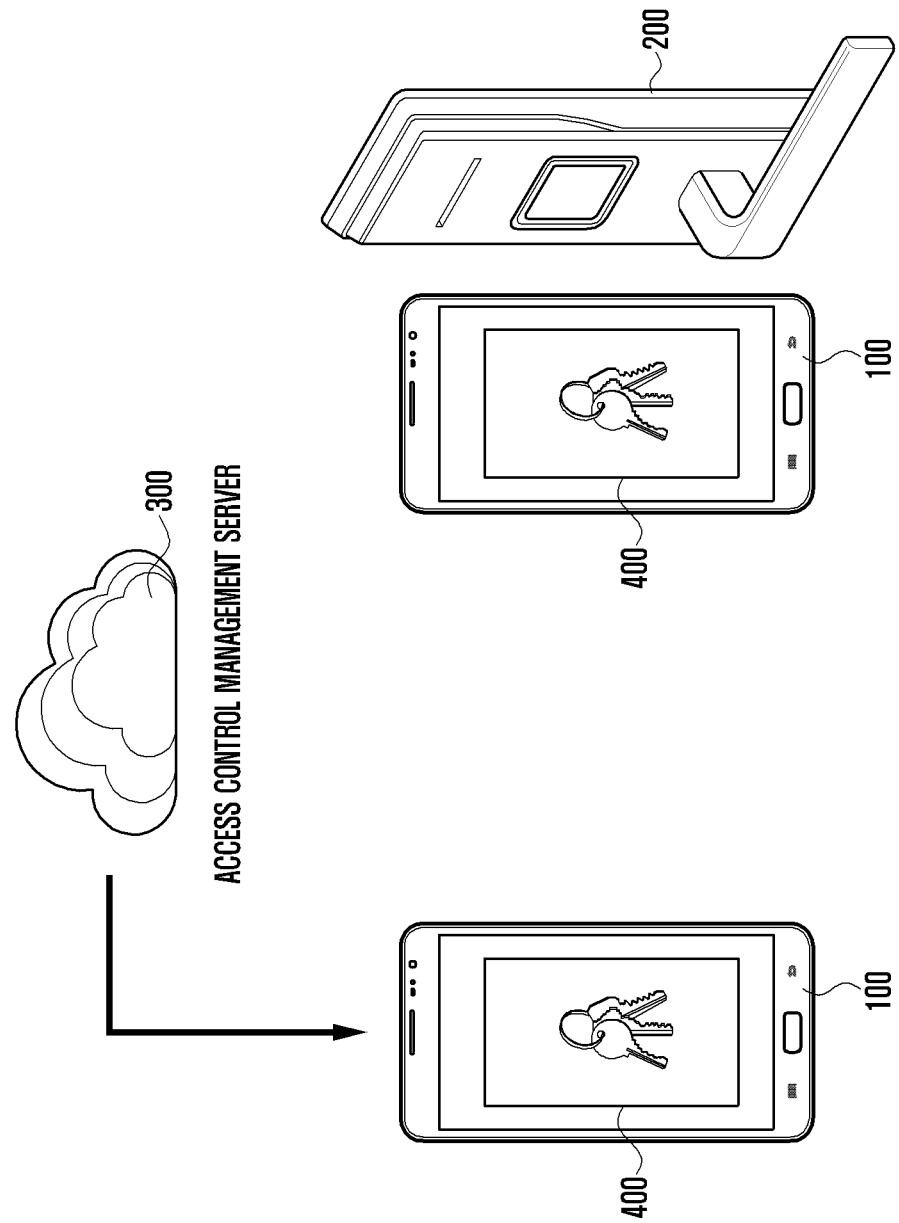
FIG. 1 is a schematic view of an access control system using an electronic device according to an embodiment of the disclosure.

FIG. 1 is a schematic view of an access control system using an electronic device according to an embodiment of the disclosure.

With reference to FIG. 1, in various embodiments, the access control system may include an electronic device 100, a door lock apparatus 200, and an access control management server 300.

In one embodiment, the electronic device 100 may communicate with the access control management server 300 to receive information on a digital card key 400 for unlocking the door lock apparatus 200. Here, the digital card key 400 may include the same data and access authorization information as a magnetic card matching the door lock apparatus 200. The access authorization information may be created temporarily and may be changed depending on the settings. For example, the access control system of an accommodation facility such as a hotel may add accommodation information and identification information (or code information) of the door lock apparatus as access authorization information.

In one embodiment, the electronic device 100 may generate a magnetic field signal. For example, the user can unlock the door without a magnetic card by activating an MST module (not shown) for inducing magnetic field generation and sending a magnetic field signal to the door lock apparatus 200 through the MST module. Here, the magnetic field signal generated by the electronic device 100 may be the same as the magnetic field signal generated by a magnetic card swiped or inserted into the card reader of the door lock apparatus. The magnetic field communication may be, but not limited to, magnetic secure transmission (MST) or near field magnetic stripe transmission.

In one embodiment, the electronic device 100 can activate the MST module in response to the digital card key 400 received from the access control management server 300 and output an MST signal corresponding to the digital card key 400 to the outside. The electronic device 100 can use the MST module to emit an MST signal including the digital card key 400 of the door lock apparatus multiple times on a periodic basis of a period T. For example, an MST signal corresponding to the information of the digital card key 400 in a forward direction may be repeatedly transmitted on a periodic basis, or an MST signal corresponding to the information of the digital card key 400 in a forward direction and an MST signal corresponding to the information of the digital card key 400 in a reverse direction may be alternately transmitted on a periodic basis.

In one embodiment, the door lock apparatus may include a magnetic card slot. For example, the door lock apparatus can be switched on and driven by an internal physical structure when a magnetic card is inserted or swiped into the magnetic card slot. The door lock apparatus with physical triggering may operate only when a magnetic card is inserted into the slot, and may not operate when a magnetic card is not inserted.

In one embodiment, the door lock apparatus 200 may set identification information (e.g., room code) thereof or key information for unlocking, and store the identification information or the key information. The door lock apparatus 200 can identify the current time based on a timer.

In one embodiment, the door lock apparatus 200 may be woken up from the sleep mode in response to electrical triggering based on the MST signal in addition to physical triggering. In the door lock apparatus 200, an MST signal receiving module (e.g., magnetic signal reader circuit) and a wakeup circuit can be electrically connected. The door lock apparatus 200 may activate the wakeup circuit, drive other internal circuits, determine whether the MST signal is normal data for unlocking, and unlock the door.

In one embodiment, the access control management server 300 can store and manage the digital card key information corresponding to each door lock apparatus 200. The access control management server 300 may communicate with the electronic device 100 to identify the user of the electronic device 100 for access authorization and may provide the electronic device 100 with digital card key information for unlocking the door lock apparatus 200 if the user authentication is completed.

In one embodiment, in the case of a company, a hotel, an efficiency apartment, an accommodation facility, or the like, the access control management server 300 can manage a plurality of door lock apparatuses. For example, the access control management server 300 of a hotel can, based on the accommodation information (e.g., room number, and date of stay) of a user, provide digital card key information identical to the data of a magnetic card matching the door lock apparatus 200 of the accommodation room to the user's electronic device 100. Here, the digital card key information may be the same as the track information of a magnetic card matching the door lock apparatus 200.

In one embodiment, when there are a plurality of users who have passed the user authentication for access authorization, the access control management server 300 may provide the digital card key information of the door lock apparatus to the electronic device corresponding to each user.

Figure 2:
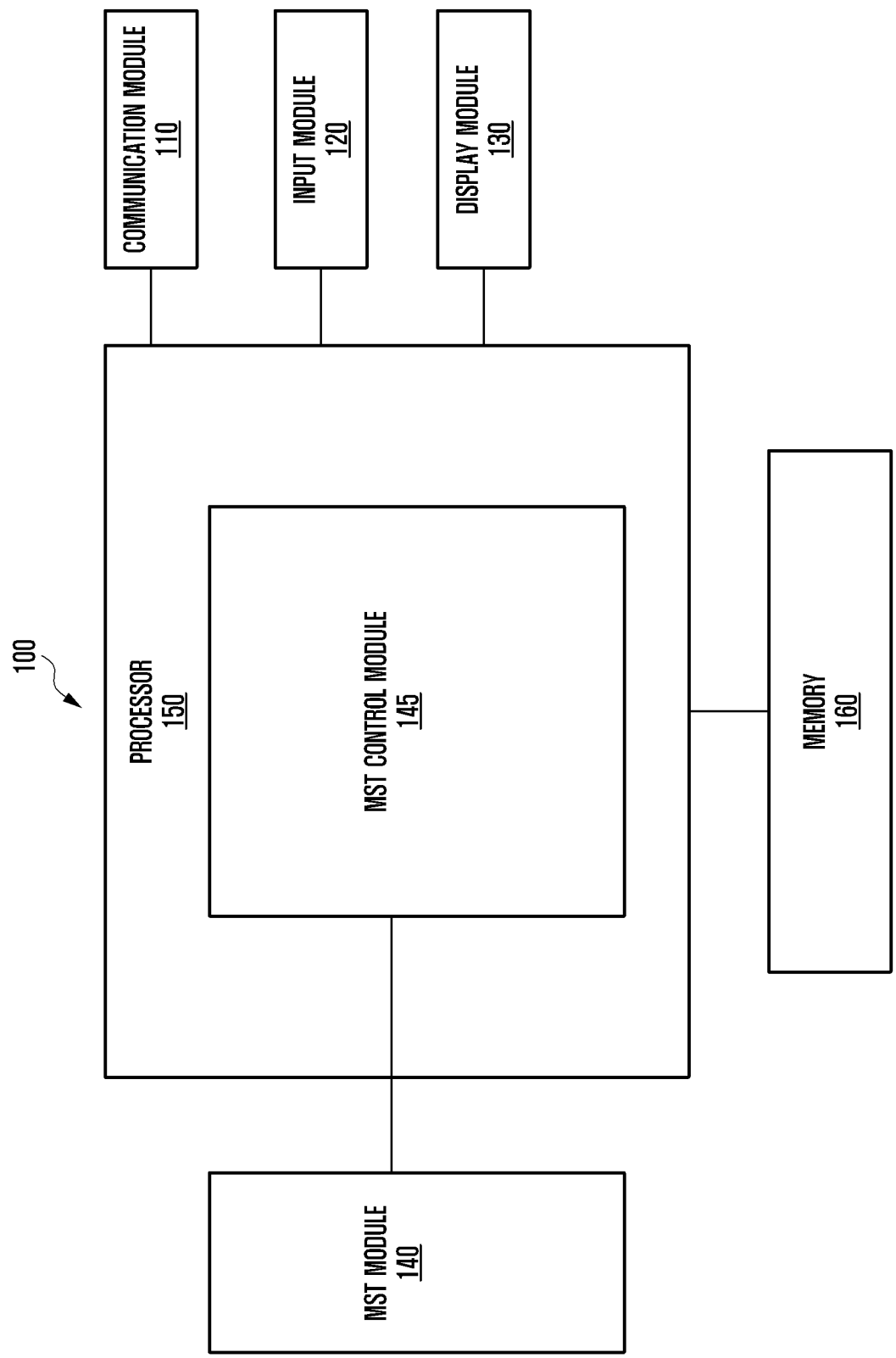
FIG. 2 is a block diagram of an electronic device according to an embodiment of the disclosure.

FIG. 2 is a block diagram of an electronic device according to an embodiment of the disclosure.

In one embodiment, with reference to FIG. 2, the electronic device 100 may include a communication module 110, an input module 120, a display module 130, an MST module 140, a processor 150, and a memory 160.

The communication module 110 enables the electronic device 100 to communicate with, for example, an external device (e.g., access control management server 300 of FIG. 1) or other electronic devices. The communication module 110 may be connected to a network via wireless or wired communication to communicate with an external device (e.g., access control management server or another electronic device).

Wireless communication may be cellular communication using at least one of, for example, LTE, LTE-A (LTE Advanced), CDMA (code division multiple access), WCDMA (wideband CDMA), UMTS (universal mobile telecommunications system), WiBro (Wireless Broadband), or GSM (Global System for Mobile Communications). In one embodiment, wireless communication may use at least one of, for example, wireless fidelity (WiFi), Bluetooth, Bluetooth low energy (BLE), Zigbee, near field communication (NFC), Magnetic Secure Transmission, RFID, or a body area network (BAN). In one embodiment, wireless communication may use the global navigation satellite system (GNSS). The GNSS may include at least one of, for example, the global positioning system (GPS), the global navigation satellite system (Glonass), the Beidou navigation satellite system (Beidou), or the European global satellite-based navigation system (Galileo). Herein, the term "GPS" may be used interchangeably with the term "GNSS". Wired communication may use at least one of, for example, Universal Serial Bus (USB), High Definition Multimedia Interface (HDMI), Recommended Standard 232 (RS-232), power line communication, or Plain Old Telephone Service (POTS). The network may be a telecommunications network, such as a computer network (e.g., local area network (LAN) or wide area network (WAN)), the Internet, or a telephone network.

The input module 120 may include, for example, a touch panel, a (digital) pen sensor, a key, or an ultrasonic input tool. The touch panel may use capacitive, resistive, infrared, or ultrasonic technology. The touch panel may include a control circuit. The touch panel may further include a tactile layer to provide a tactile response to the user. The (digital) pen sensor may be a part of the touch panel or may include a separate recognition sheet. The keys may include, for example, a physical button, an optical key, or a keypad. The ultrasonic input tool can detect an ultrasonic wave generated by the input tool through a microphone (not shown) and identify the data corresponding to the detected ultrasonic wave.

The display module 130 may include a display (e.g., display panel), a hologram unit, a projector, and a control circuit to control them. The panel may be implemented to be, for example, flexible, transparent, or wearable. The panel and the touch panel may be implemented as a single module (e.g., touchscreen). The hologram unit may present three dimensional images in the air by using interference of light. The projector may display an image by projecting light onto a screen. The screen may be located inside or outside the electronic device 100.

The display 130 may include, for example, a liquid crystal display (LCD), a light emitting diode (LED) display, an organic LED (OLED) display, a micro-electromechanical systems (MEMS) display, or an electronic paper display. The display module 130 may display a variety of content (e.g., text, image, video, icon, or symbol) for the user. The display module 130 may include a touchscreen and may receive a touch input, a gesture input, a proximity input, or a hovering input through, for example, an electronic pen or a body portion of the user.

The processor 150 may include one or more of a central processing unit (CPU), an application processor (AP), and a communication processor (CP). The processor 150 may control at least one component of the electronic device 100 and perform communication-related or data processing operations for the other components.

The processor 150 may control a plurality of hardware or software components connected thereto, process various pieces of data, and perform calculations by executing, for example, the operating system or application programs. The processor 150 may be implemented as, for example, a system on chip (SoC). In one embodiment, the processor 150 may further include a graphics processing unit (GPU) and/or an image signal processor. The processor 150 may load instructions or data received from at least one component (e.g., non-volatile memory) onto the volatile memory for execution and may store processed data in the non-volatile memory.

The memory 160 may include a volatile memory and/or a non-volatile memory. The memory 160 may store, for example, a command or data related to at least one component of the electronic device 100. In one embodiment, the memory 160 may store software and/or programs. The programs may include, for example, a kernel, a middleware, an application programming interface (API), and/or an application program (or application). At least some of the kernel, the middleware or the API may be referred to the operating system (OS). The kernel may control or manage the system resources (e.g., bus, processor, or memory) that are used to execute operations or functions implemented in other programs (e.g., middleware, API, or application program). Further, the kernel may provide an interface that enables the middleware, the API or the application program to control or manage the system resources by accessing the individual components of the electronic device.

The memory 160 may include, for example, an internal memory or an external memory. The internal memory may include at least one of a volatile memory (e.g., DRAM, SRAM, or SDRAM), or a non-volatile memory (e.g., one-time programmable read only memory (OTPROM), PROM, EPROM, EEPROM, mask ROM, flash ROM, flash memory, hard disk drive, and solid state drive (SSD)). The external memory may include a flash drive such as compact flash (CF), secure digital (SD), micro-SD, mini-SD, extreme digital (xD), or multi-media card (MMC) and may further include a memory stick or the like. The external memory may be functionally and/or physically connected to the electronic device through various interfaces.

In one embodiment, the electronic device 100 may further include an MST module 140 and an MST control module 145 to control the MST module. Although the processor 150 is shown as including the MST control module 145 in the drawing, the MST control module 145 may be implemented as a separate entity from the processor 150.

The MST module 140 may include a coil antenna. The MST module 140 may further include an inductor, a capacitor, and a resistor. In one embodiment, the MST module 140 may further include an amplifier for amplifying the signal. In another embodiment, the MST module 140 may include multiple coil antennas.

The MST module 140 can apply voltages of different directions to both ends of the coil antenna according to data (e.g., 0 or 1 bit) to control the direction of the current flowing in the coil antenna. The MST signal (the magnetic field signal generated by the current flowing through the coil) emitted by the coil antenna can generate an induced electromotive force in a manner similar to the magnetic field signal generated between the magnetic card and the door lock apparatus.

In one embodiment, the MST control module 145 can convert the digital card key information received from the access control management server through the communication module 110 into a format for delivery using the MST signal. For example, the MST control module 145 may include a circuit to change the direction of a voltage supplied to both ends of the MST module 140.

The MST control module 145 may activate the coil antenna of the MST module 140 and control the MST module 140 to emit an MST signal. The MST signal may be composed of a stream of pulses representing 0 or 1 for a period of time. For example, if the direction of the magnetic field is changed once for a preset period of time T0, this period represents '0'; and if the direction of the magnetic field is changed twice, this period may represent '1'. The MST control module 145 can generate a pulse stream corresponding to the digital card key information and emit an MST signal corresponding to the pulse stream to the door lock apparatus.

In one embodiment, the MST control module 145 may transmit differential forms of data having different phases. In another embodiment, the MST control module 145 may transmit the track 1 information and the track 2 information of the magnetic card in sequence in a time-division manner, or transmit the track 1 information and the track 2 information in an interleaved manner. In another embodiment, the MST control module 145 may transmit track 1 data and track 2 data whose some bits are inverted (e.g., from 00001000 to 11110111). In another embodiment, the MST control module 145 may transmit an MST signal including a security sequence corresponding to preset data to activate the wakeup circuit of the door lock apparatus. In another embodiment, the MST control module 145 may transmit an MST signal including access authorization information and magnetic card information, or may continuously transmit MST signals of type A and type B.

In various embodiments, the electronic device may communicate with the access control management server in response to a user input to reset the access authorization request, or may support a settlement function for renewing the mobile key card and access authorization according to a grant of approval.

Figure 3:
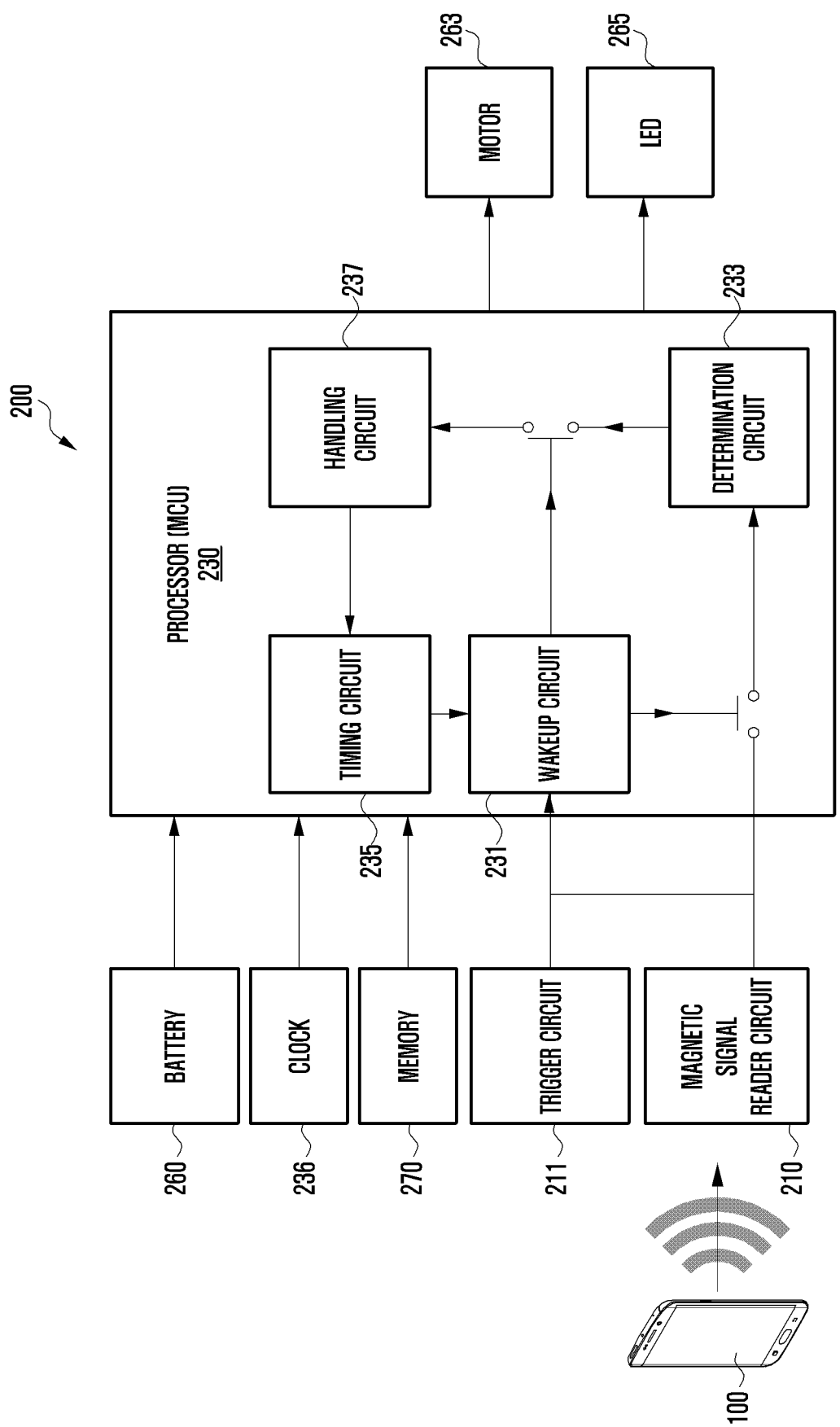
FIG. 3 is a block diagram of a door lock apparatus according to an embodiment of the disclosure.

FIG. 3 is a block diagram of a door lock apparatus according to an embodiment of the disclosure.

With reference to FIG. 3, in one embodiment, the door lock apparatus 200 can be activated according to physical triggering by a magnetic card and electrical triggering by an MST signal.

In one embodiment, the door lock apparatus 200 may include a magnetic signal reader circuit 210 (e.g., MST signal receiving module) 210 and a processor 230. The processor 230 may include a wakeup circuit 231 electrically connectable to the magnetic signal reader circuit 210, a determination circuit 233 to determine whether the MST signal is data compatible, and a handling circuit 237 to determine whether the MST signal received through the determination circuit is for unlocking and to control the door lock apparatus to unlock the door if necessary.

The door lock apparatus 200 may further include a physical trigger circuit 211 for physical triggering, a timing circuit 235 to identify the current time and count a preset time, a clock 236, a battery 260, a motor 263, an LED module 265, and a memory 270.

In one embodiment, the magnetic signal reader circuit 210 can receive an MST signal emitted by the magnetic field induction with the electronic device. In response to reception of an MST signal from the electronic device, the magnetic signal reader circuit 210 can activate the wakeup circuit 231 by transmitting an interrupt signal to the wakeup circuit 231 electrically connected through the magnetic signal. In addition, the magnetic signal reader circuit 210 is connected to a magnetic card slot. When a magnetic card is inserted or swiped into the slot, the physical trigger circuit 211 can be turned on and activate the wakeup circuit 231.

In one embodiment, the wakeup circuit 231 may be electrically connected to the physical trigger circuit 211 and the magnetic signal reader circuit 210 and may be activated by physical triggering and electrical triggering. The wakeup circuit 231 may be activated by an interrupt signal from the magnetic signal reader circuit 210 or by a signal from the physical trigger circuit 211, changing the processor 230 of the door lock apparatus 200 from the sleep mode to the operation mode. When the door lock apparatus 200 is changed to the operation mode, the processor 230 of the door lock apparatus can turn on the switch for connecting the internal constituent circuits to interconnect the magnetic signal reader circuit 210, the determination circuit 233, and the handling circuit 237.

In one embodiment, the magnetic signal reader circuit 210 can recognize the low or high state of the pulse of the received MST signal as a data value (e.g., bit 0 or 1). Alternatively, the magnetic signal reader circuit 210 may check the number of transitions between low and high for a preset time period and recognize it as a data value. For example, the magnetic signal reader circuit 210 may recognize bit 0 for one transition between low and high during a preset time period, and may recognize bit 1 for two transitions between low and high.

In one embodiment, when the door lock apparatus is changed to the operation mode, the magnetic signal reader circuit 210 may transmit the recognized data carried by the MST signal to the determination circuit 233. The magnetic signal reader circuit 210 may periodically receive an MST signal, analyze the MST signal according to time slots and low or high states, and output the analyzed signal to the determination circuit 233.

The determination circuit 233 can determine whether the received data is normal data including the digital card key information. The door lock apparatus can store in advance its identification information (or code information) and an unlocking password, and can also store track information (e.g., magnetic black bands) of a magnetic card matching itself. Here, the track information may include track 1 information and track 2 information.

The determination circuit 233 may compare the received data with the configured information to determine whether the received data matches the track information of the magnetic card.

In one embodiment, the determination circuit 233 can check the access authorization information, for example, access admission time and identification information of the apparatus in addition to the track information of the magnetic card. The determination circuit can check the access authorization information first, and then check the magnetic card track information. These checking operations can be performed in sequence or in parallel.

In another embodiment, the determination circuit 233 can determine whether the recognized data is arranged in the forward direction first, and then determine whether the recognized data is arranged in the reverse direction.

In one embodiment, the processor 230 of the door lock apparatus can activate the timing circuit 235 and count the elapsed time. The handling circuit 237 may check the elapsed time to monitor whether the received MST signal is determined to be normal data within a preset operation time. If unlocking approval is determined within a preset time, the processor 230 can control the motor 263 via the handling circuit 237 to unlock the door lock apparatus. In reverse, if unlocking disapproval is determined within a preset time, the processor 230 may change the door lock apparatus from the operation mode to the lock mode. In this case, the processor 230 may control the on-and-off state of the LED module 265 to notify the user of the success or failure of unlocking.

Figure 4:
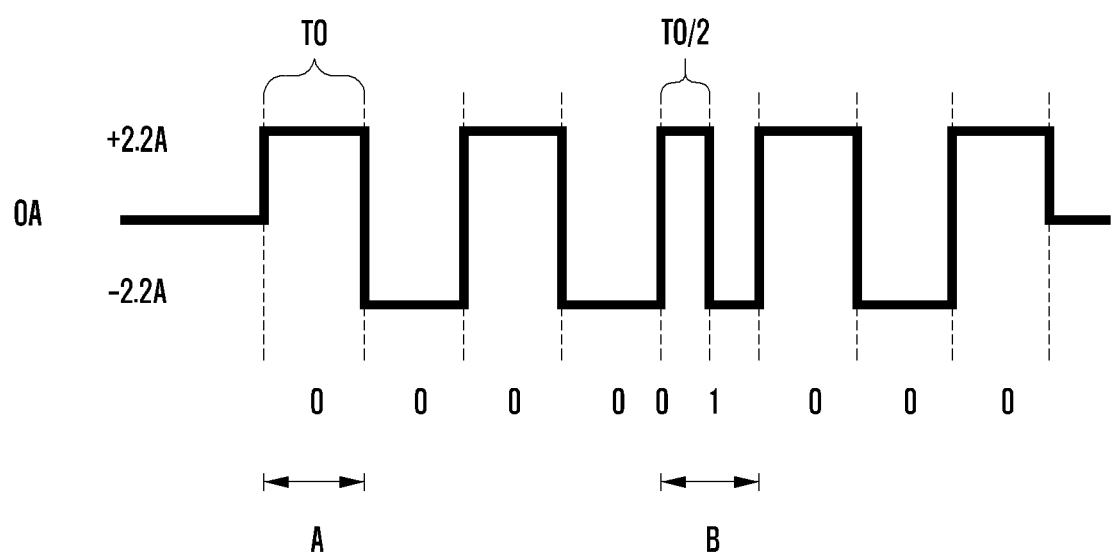
FIG. 4 depicts an MST signal emitted by an MST module according to an embodiment of the disclosure.

FIG. 4 depicts an MST signal emitted by the MST module according to an embodiment of the disclosure.

With reference to FIG. 4, in one embodiment, the MST signal may be delivered as a signal sequence composed of a stream of pulses representing 0 or 1 for a given period T0. The electronic device and the door lock apparatus can recognize the MST signal as data composed of low and high states. For example, if the direction of the magnetic field changes one time during a given period T0, this period may represent bit 0, and if the direction of the magnetic field changes twice, this period may represent bit 1.

For example, for period A, as the voltage is changed from positive (+) to negative (−) for time T0, period A (with one transition) can represent bit 0. For period B, as the voltage is changed from positive to negative during time T0/2 and then changed from negative to positive during remaining time T0/2, period B (with two transitions) can represent bit 1. The signal sequence shown in FIG. 4 can represent "00001000". Here, the time T0 may be, but not limited to, 50 to 600 μs. The MST signal shown in FIG. 4 is only an example of representing the data, and the electronic device and the door lock apparatus can determine whether the data is normal based on the data represented in high and low states.

Figure 5:
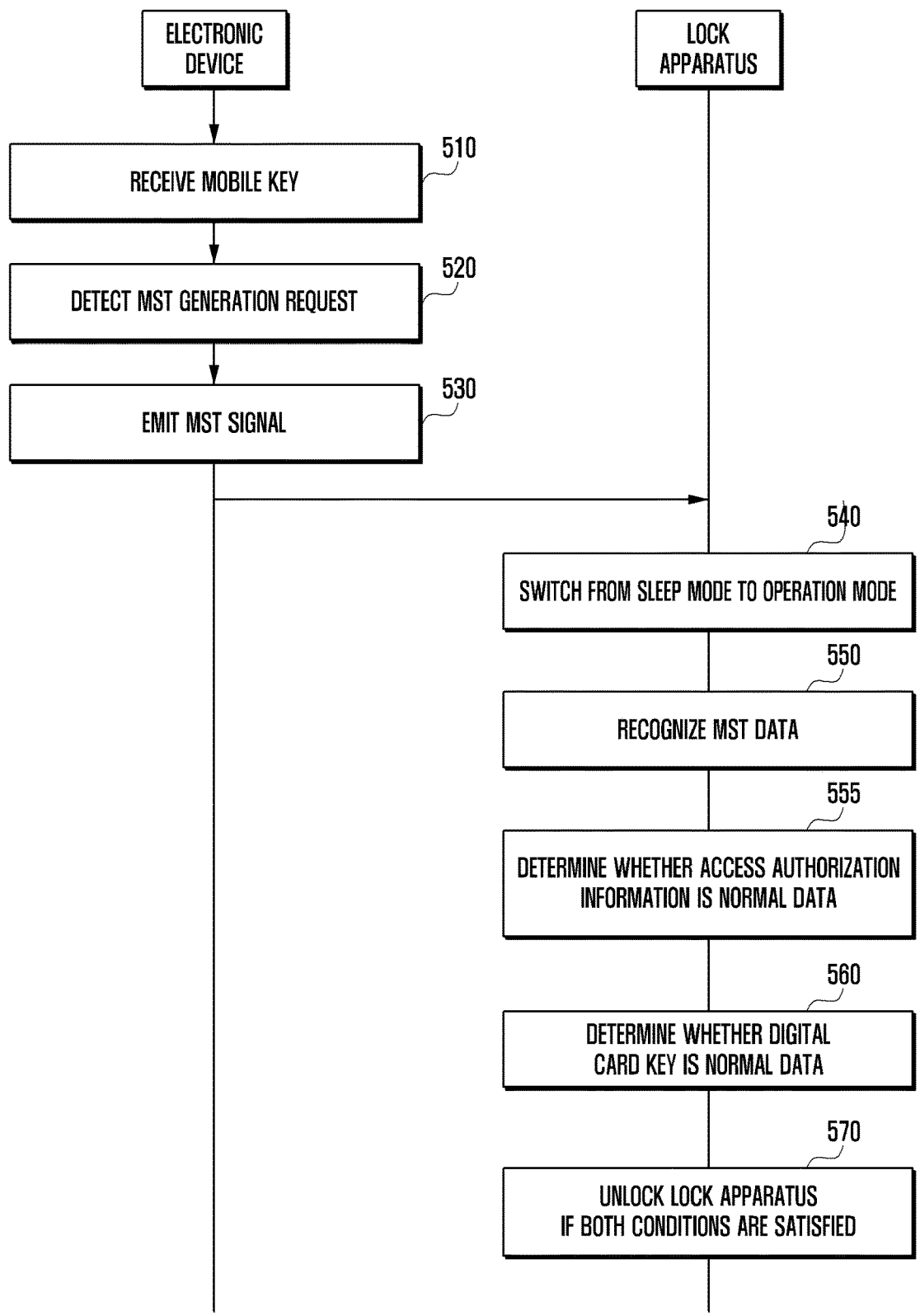
FIG. 5 is a sequence diagram illustrating operations of the electronic device and the door lock apparatus according to an embodiment of the disclosure.

FIG. 5 is a sequence diagram illustrating operations of the electronic device and the door lock apparatus according to an embodiment of the disclosure.

With reference to FIG. 5, at operation 510, the electronic device 100 may receive digital card key information corresponding to a particular door lock apparatus 200. For example, the electronic device 100 may connect to the access control management server and receive digital card key information matching the door lock apparatus from the access control management server. The access control management server may authenticate the user of the electronic device, check the access authorization information (e.g., accommodation information), generate a digital card key that matches the identification information (or code information) of the door lock apparatus corresponding to the access authorization information, and provide the digital card key to the electronic device.

At operation 520, the electronic device may detect an MST generation request. For example, the user may move near the door lock apparatus and issue a request for activating a digital card key application of the electronic device to activate the MST module. The electronic device may activate the MST module in response to activation of the digital card key application.

At operation 530, the electronic device can generate an MST signal including digital card key information and transmit the MST signal in response to a user input. Here, the electronic device can emit an MST signal including access authorization information together with the digital card key information for unlocking the door lock apparatus. The access authorization information may include the identification information (or code information) of the door lock apparatus and the access authorization time.

Upon receiving the MST signal from the electronic device, at operation 540, the door lock apparatus 200 can be electrically triggered by the MST signal and can be changed from the sleep mode to the operation mode. Here, the MST signal may correspond to an interrupt signal transmitted to the wakeup circuit. The door lock apparatus 200 may periodically receive an MST signal at regular intervals (T).

In one embodiment, the door lock apparatus 200 can compare the data recognized from the MST signal with configured data to determine whether the recognized data is normal data.

Specifically, at operation 550, the door lock apparatus 200 may recognize MST data represented in high and low states from the received MST signal. At operation 555, the door lock apparatus 200 may determine whether the access authorization information is normal data. Here, the access authorization information may include identification information (or code information) of the door lock apparatus and access authorization time information. The door lock apparatus can identify the access authorization time and the access completion time based on the internal time information.

For example, when the access authorization time included in the MST signal is from 12:00 on Jan. 20 2016 to 12:00 on Jan. 21 2016, the door lock apparatus may compare pieces of time information based on the internal timer. If the received access authorization time matches the preset access authorization time, the door lock apparatus may determine that the received data is normal data for a time duration from 12:00 on Jan. 20 2016 to 12:00 on Jan. 21 2016 and perform operation 560 and subsequent operations for unlocking. If the received access authorization time does not match the preset access authorization time, the door lock apparatus may determine that the received data is not normal data out of the above time duration.

As another example, the access authorization information may include a security sequence set for activating the wakeup circuit. For additional security, the door lock apparatus may pre-store security sequence data set for activating the wakeup circuit, and the electronic device may receive both the security sequence and the digital card key information the door lock apparatus from the access control management server. The electronic device may determine whether the security sequence is normal by sending the security sequence to the door lock apparatus first.

Upon determining that the access authorization information is normal data, at operation 560, the door lock apparatus can determine whether the digital card key included in the MST information is normal data. For example, the door lock apparatus can determine whether the digital card key information is normal data by comparing the digital card key information with a preset password.

If both the access authorization information and the digital card key satisfy the normal data condition, the door lock apparatus can unlock the corresponding door by driving the motor for unlocking.

For example, upon determining that the access authorization information or the digital card key is abnormal data, the door lock apparatus may notify that the data is abnormal and terminate its operation.

Figure 6:
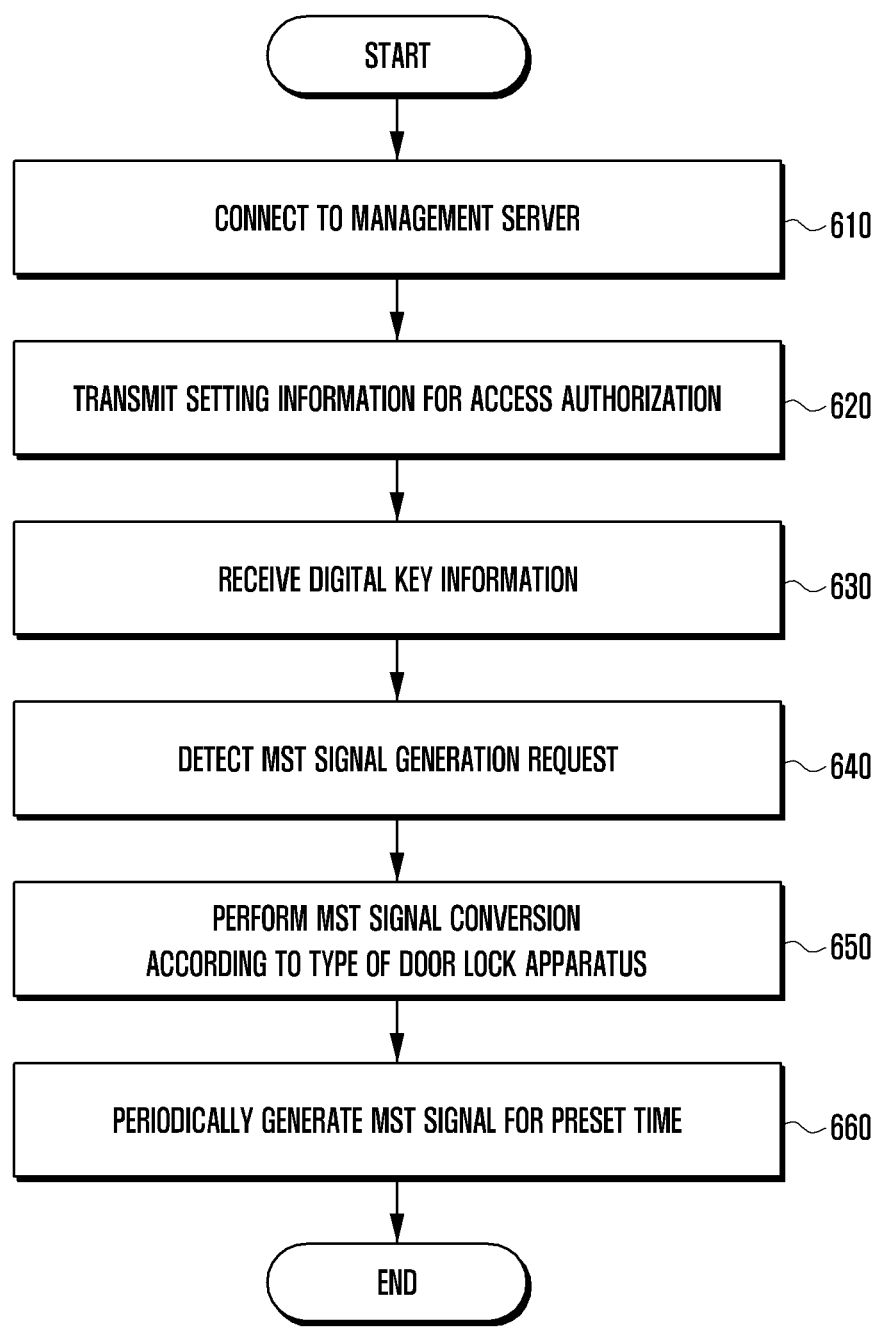
FIG. 6 is a flowchart of a method for unlocking the door lock apparatus according to an embodiment of the disclosure.

FIG. 6 is a flowchart of a method for unlocking the door lock apparatus according to an embodiment of the disclosure.

With reference to FIG. 6, at operation 610, the electronic device can connect to the access control management server. In one embodiment, the electronic device can connect to the access control management server by executing an application program or an application for issuing a digital card key.

At operation 620, the electronic device can transmit setting information for access authorization to the access control management server. The setting information may include, but not limited to, door room information and access request information (e.g., accommodation period, and stay time).

At operation 630, the electronic device can receive the digital card key information of the door lock apparatus corresponding to the access request information from the access control management server.

In one embodiment, the access control management server may authenticate the user, determine whether to permit access based on the user authentication result, and provide the digital card key information to the electronic device if the authorization condition is satisfied. The digital card key information may include access authorization information corresponding to the setting information of the user and information identical to the magnetic card data of the door lock apparatus.

At operation 640, the electronic device may detect an MST signal generation request. At operation 650, the electronic device may convert the digital card key information into an MST signal according to the type of the door lock apparatus in response to the MST signal generation request.

In one embodiment, the user can activate the digital card key issued to the electronic device. Then, the electronic device can induce magnetic field generation by applying a current to the coil antenna of the MST module. The electronic device can generate an MST signal corresponding to the type of the door lock apparatus and emit the generated MST signal.

In one embodiment, the MST signal may be a signal sequence composed of a value corresponding to the access authorization information and a value identical to the magnetic card data, or may be separate signal sequences being continuously emitted.

In another embodiment, the MST signal emitted by the electronic device may include the same signal sequence that is repeated periodically, or may include a forward signal sequence and a reverse signal sequence that are alternately repeated.

In another embodiment, the electronic device may emit first a signal sequence having a value corresponding to the preset information to activate the wakeup circuit of the door lock apparatus for triggering the door lock apparatus, and then emit a signal sequence composed of a value corresponding to the access authorization information and a value identical to the magnetic card data.

At operation 660, the electronic device may periodically emit the MST signal for a preset time or until a user request is received.

Although not shown in the drawing, in various embodiments, the electronic device can support the payment function for the access related cost (e.g., accommodation cost) using the access control management server and the payment system. For example, the access control management server may transmit a request for payment information to the electronic device in response to the setting information or the access request of the user. The electronic device may display information on the payment request to notify the user of the payment information, and may perform payment on the access authorization cost based on the payment information registered by the user. The access control management server can authenticate the user and verify the settlement information, and transmit the digital card key information to the electronic device of the user correspondingly.

In another embodiment, the electronic device can update the access authorization information and the digital card key information through the access control management server. The electronic device can make an update request for the access authorization time through an application managing the digital card key, and the access control management server can determine whether to accept the update request for the access authorization time. For example, when a user staying at a hotel wishes to extend the stay by one day, the user can connect to the access control management server of the hotel by using the electronic device and enter information on the accommodation room and the date of stay to make a request for extension of stay. If the extension request can be accepted, the access control management server can transmit a request for payment to the electronic device. When payment for the accommodation fee is completed, the access control management server can transmit new digital card key information to reissue or update the digital card key provided to the user's electronic device.

Figure 8:
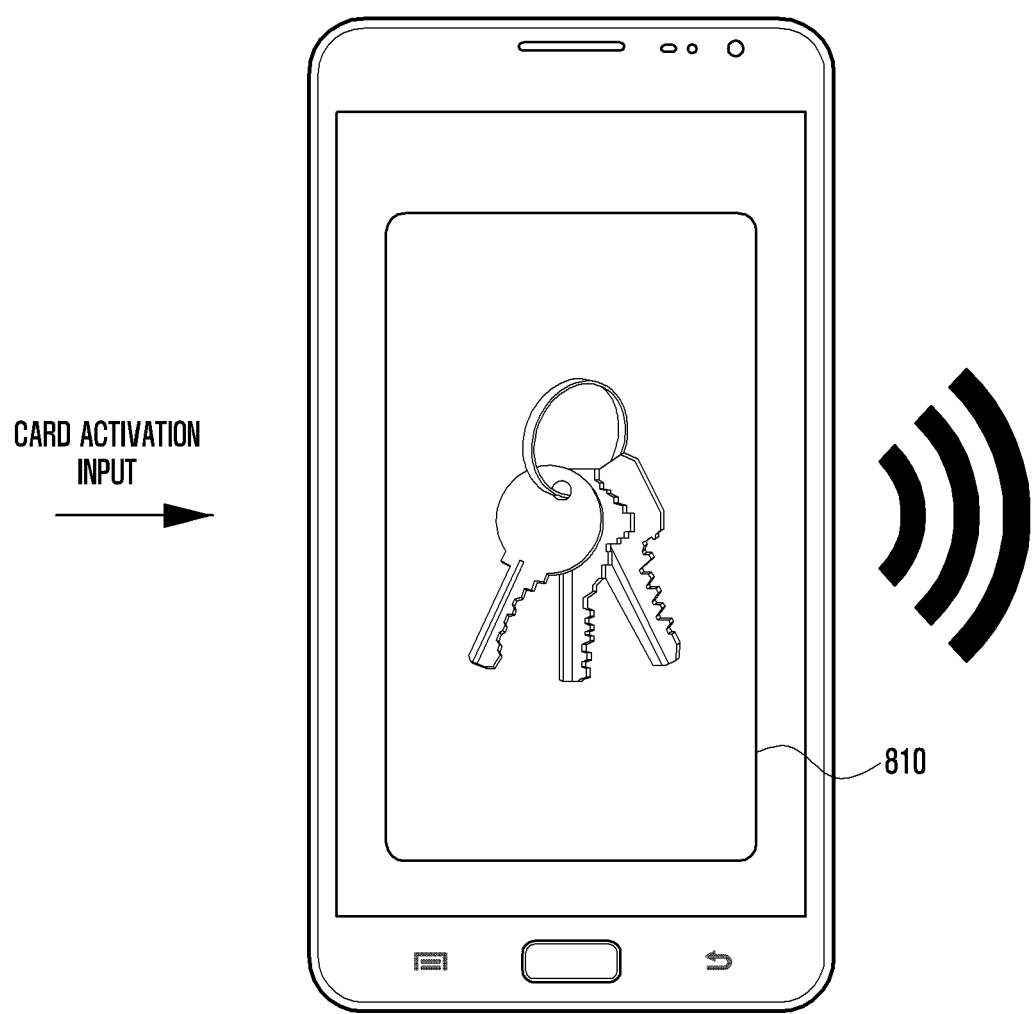

FIGS. 7 and 8 are representations of the user interface of the electronic device according to an embodiment of the disclosure.

With reference to FIG. 7, the electronic device may execute a digital card key application or an application for connecting to the access control management server in response to a user input. As indicated by indicia 701, the electronic device may provide a user authentication screen 710 to make a request for access authorization. The user authentication screen 710 may include, but not limited to, an ID field 711, a password field 712, and a confirmation field 715.

The user can enter a user ID and password in the ID field 711 and the password field 712 and touch the OK field to perform user authentication with the access control management server. The access control server can authenticate the user by comparing the input user information with the registered user information and notify the electronic device of the user authentication result.

Thereafter, the electronic device can provide a setting screen 720 for issuing a digital card key as indicated by indicia 702. The setting screen for issuing the digital card key may include fields for receiving accommodation information (e.g., check-in time, check-out time, room information, stay period, and number of persons). The user may enter setting information for the access request in the setting screen 720 and select the key issue field 725. Then, the electronic device can transmit the setting information input by the user to the access control management server. The access control management server may determine whether to accept the access request based on the setting information. Upon determining to accept the access request, the access control management server can transmit the corresponding digital card key information to the electronic device.

Then, the electronic device may download the digital card key information from the access control management server and output a corresponding card image 735 on the screen 730 as indicated by indicia 704.

In various embodiments, the electronic device may support a payment function for the costs associated with access authorization. For example, when the access control management server has employed a payment system, the electronic device may provide the user with a user interface screen 740 for the payment of costs via the display as indicated by indicia 704. Then, the user can select the payment field 745 to enter payment information. The electronic device can initiate the cost payment procedure by transmitting the user authentication information and payment information to the access control management server. This process is not described further.

Thereafter, when the user wishes to unlock the door lock apparatus, the mobile card key downloaded to the electronic device can be activated. The electronic device may detect an input for activating the mobile card key application or an input for displaying the stored mobile key card image on the screen. Then, as shown in FIG. 8, the electronic device may display a card image 810 corresponding to the digital card key on the display in response to the user input. In addition, the electronic device can activate the MST module and induce magnetic field generation by applying a current to the coil antenna of the MST module. The electronic device can repeatedly emit MST signals of the same or different forms while the card image is displayed.

Figure 9:
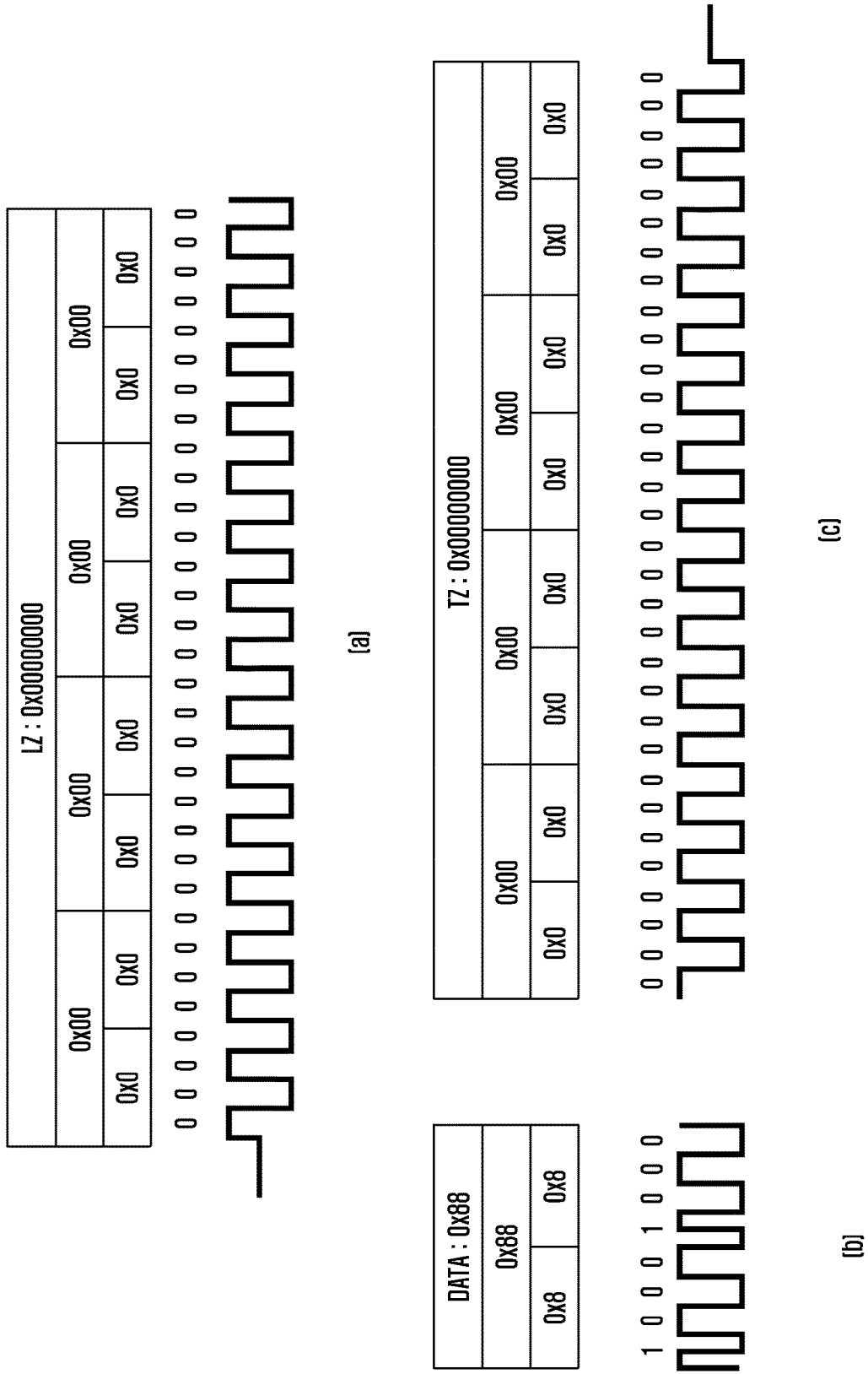
Figure 10:
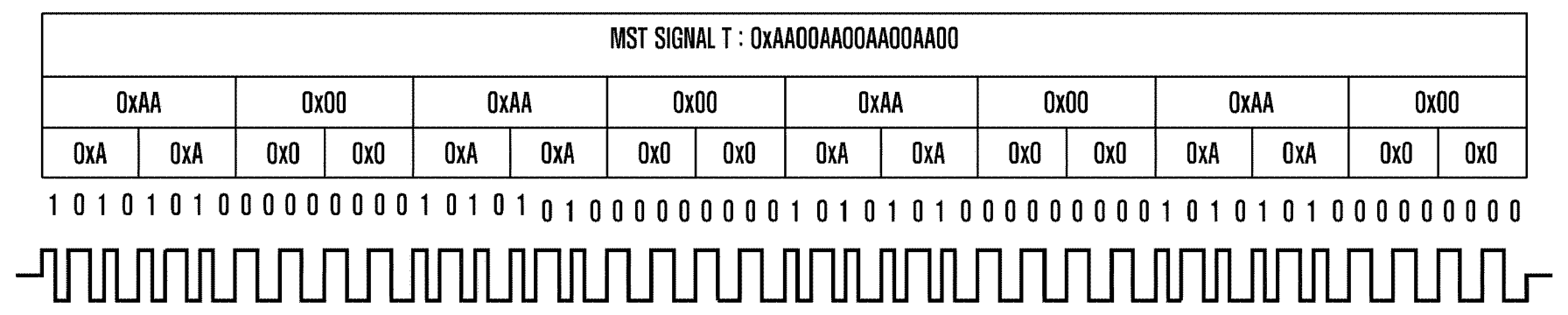
Figure 11:
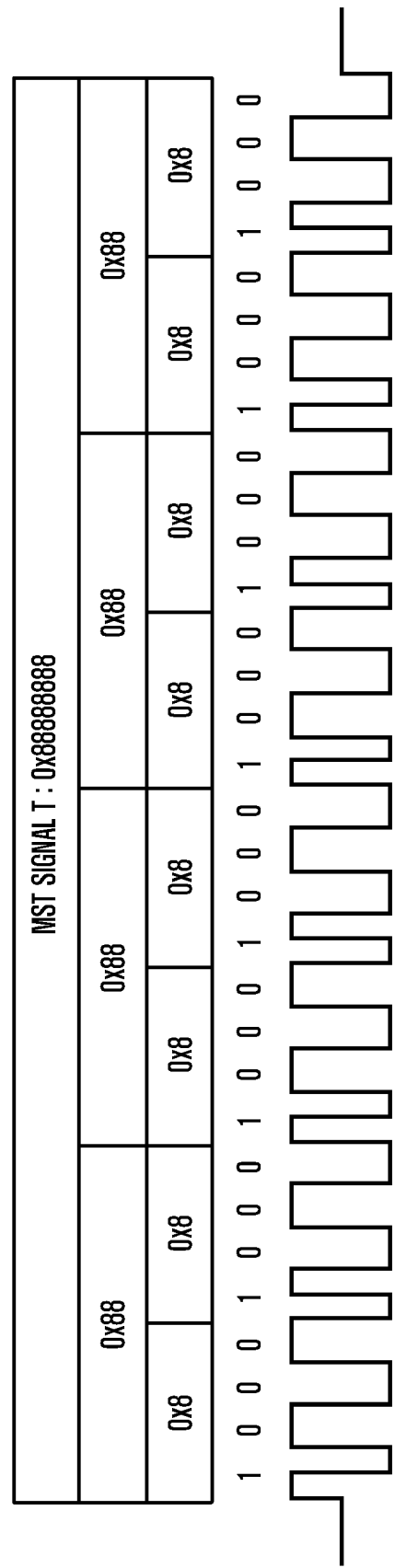

FIGS. 9 to 11 show examples of data in an MST signal according to an embodiment of the disclosure.

With reference to FIGS. 9 to 11, the electronic device can emit various forms of MST signals to the door lock apparatus. The electronic device may repeatedly emit an MST signal having the same data, or may repeatedly emit an MST signal whose forward data and corresponding reverse data alternate with each other.

In one embodiment, as shown in FIG. 9, the MST signal may include card data in the form of leading zeros (Lz), data, and trailing zeros (Tz). The door lock apparatus may analyze a received MST signal to recognize card data in the form of FIG. 9. When the data format shown in FIG. 9 is used, to transmit data "10001000", a signal with "10001000" may be repeatedly transmitted. Alternatively, a forward signal with "00010001" and a reverse signal with "00010001" may be repeatedly transmitted in an alternating way.

In another embodiment, before providing the digital card key information of the door lock apparatus, the electronic device can emit an MST signal having security data specific to the door lock apparatus. Here, the security data specific to the door lock apparatus may be information set to enable the wakeup circuit of the door lock apparatus. For example, the security data for enabling the wakeup circuit may be, but not limited to, 32-bit data as shown in FIG. 10 or 16-bit data as shown in FIG. 11. The electronic device can transmit the security data of the form shown in FIG. 10 or 11 as a first MST signal, and transmit the data including digital card key information as a second MST signal. Then, the electronic device may repeatedly transmit the second MST signal on a periodic basis, or may repeatedly transmit the forward second MST signal and the reverse second MST signal in an alternating way.

Figure 12:
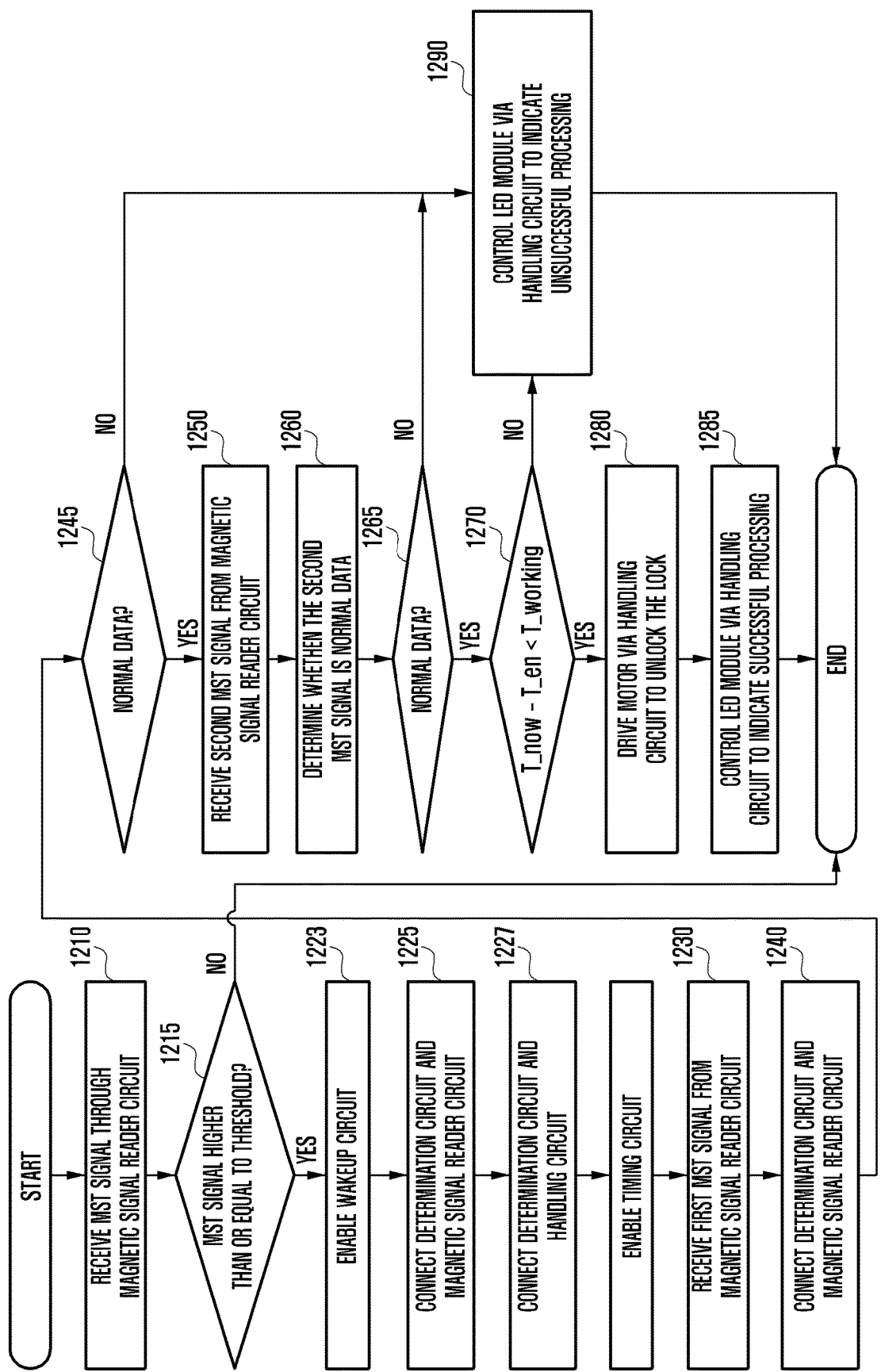
FIG. 12 is a flowchart showing operations of the door lock apparatus according to an embodiment of the disclosure.

FIG. 12 is a flowchart showing operations of the door lock apparatus according to an embodiment of the disclosure.

With reference to FIG. 12, at operation 1210, the door lock apparatus may receive an MST signal through the magnetic signal reader circuit. Here, the magnetic signal reader circuit may receive an MST signal emitted by the electronic device and temporarily store the MST signal in the buffer.

At operation 1215, the door lock apparatus may determine whether the MST signal received by the magnetic signal reader circuit is higher than or equal to a preset threshold for enabling the wakeup circuit. If the MST signal is higher than or equal to the preset threshold, the door lock apparatus may output an interrupt signal to the wakeup circuit in response to reception of the MST signal.

At operation 1220, the wakeup circuit of the door lock apparatus may be activated by the interrupt signal from the magnetic signal reader circuit, waking up the processor.

The processor, which is changed from the sleep mode to the operation mode by the wakeup circuit, can turn on the switches and control the internal constituent circuits to be interconnected. Specifically, the processor may connect the determination circuit and the magnetic signal reader circuit at operation 1223, and may connect the determination circuit and the handling circuit. At operation 1227, the processor may activate the timing circuit to count the time or to verify the time information. Here, the processor may perform operations 1223 to 1227 in sequence or in parallel.

At operation 1230, a first MST signal may be sent from the magnetic signal reader circuit to the determination circuit. At operations 1240 and 1245, the determination circuit may determine whether the received first MST signal is normal data. The first MST signal may include at least one of identification information (or code information) set in the door lock apparatus, accommodation period information, or information identical to the magnetic card information.

In one embodiment, if the first MST signal includes information identical to the magnetic card information, whether the first MST signal is normal data can be determined by checking whether it matches the stored magnetic card information.

In another embodiment, if the first MST signal includes identification information (or code information) and accommodation approval information, the determination circuit may determine whether the first MST signal is normal data by first checking whether the received identification information matches the stored identification information and checking whether the current time belongs to the time range of the accommodation approval information, and then by checking whether the received magnetic card information matches the stored magnetic card information.

Upon determining that the first MST signal is normal data at operation 1245, the determination circuit may receive a second MST signal from the magnetic signal reader circuit at operation 1250. In operations 1260 and 1265, the determination circuit can determine whether the second MST signal is normal data. Here, the second MST signal may be the same as the first MST signal, or may be a reversed version of the first MST signal (bit sequence is reversed, i.e., the bits of the second MST signal are in reverse order of the bits of the first MST signal). The determination circuit can determine whether the second MST signal is normal data by checking whether it matches the stored magnetic card information.

Upon determining that the second MST signal is normal data at operation 1265, at operation 1270, the processor can determine whether the time value obtained by subtracting the timing circuit activation time T_en from the current time (T-now) is less than the operation time value (T_working) preset in the timing circuit.

In one embodiment, the door lock apparatus may recognize a normal action if authentication for unlocking is completed within a preset time, and may recognize an abnormal action and terminate the procedure if authentication for unlocking exceeds the preset time.

If the authentication process for unlocking within the preset operation time range (T_working) (e.g., operations 1230 to 1265) is processed within a preset time, at operation 1280, the processor may recognize a normal action and drive the motor via the handling circuit to unlock the door.

At operation 1285, the handling circuit may control the LED module to indicate a successful unlocking operation.

On the other hand, if the MST signal does not reach the preset threshold at operation 1214, the door lock apparatus can terminate the procedure. Upon determining that the first MST signal or the second MST signal is not normal data at operation 1245 or 1265, or upon determining that the preset operation time range is exceeded at operation 1270, at operation 1290, the processor can control the LED module to indicate that the unlock operation has been abnormally processed.

In the description, the word "module" may refer to a software component, a hardware component, a firmware component or a combination thereof "Module" may be used interchangeably with "unit", "logic", "logical block", "component", "circuit" or the like. A module may be a smallest element or a part thereof acting as a single entity. A module may be a smallest element or a part thereof supporting one or more functions. A module may be implemented mechanically or electronically. For example, a module having a specific function may be implemented using at least one of an application-specific integrated circuit (ASIC), a field-programmable gate array (FPGA), or a programmable-logic device (PLD), known to have a specific function or to be developed in the future. At least a part of the device (e.g. modules or functions) or the method (e.g. operations) according to various embodiments may be implemented as instructions in the form of a program module, which can be stored in a computer readable storage medium (e.g. memory 160). When the instructions are executed by a processor (e.g. processor 150), the processor may carry out functions corresponding to the instructions. The computer readable storage media may include magnetic media such as a hard disk and floppy disk, optical media such as a CD-ROM and DVD, magneto-optical media such as a floptical disk, and memory devices. The instructions may include codes produced by a compiler and codes executable by an interpreter. A module or program module may include at least one of the components described above. An existing component of the module may be removed or a new component may be added to the module. Operations supported by a module, program module, or another component may be carried out in sequence, in parallel, by repetition, or heuristically. Some operations may be executed in a different order or may be omitted, and a new operation may be added.

The invention claimed is:

1. An electronic device comprising:
   a wireless communication interface;
   a display;
   a magnetic stripe transmission (MST) module including a coil to induce magnetic field generation;
   a processor electrically connected with the wireless communication interface, the display, and the MST module; and
   a memory electrically connected to the processor,
   wherein the memory stores instructions that, when executed, cause the processor to:
      receive security data used for electrical triggering of a digital door lock apparatus and digital card key information for unlocking the digital door lock apparatus from an external device through the wireless communication interface,
      transmit a first MST signal generated based on the security data so as to wake up the digital door lock apparatus through the MST module, and
      transmit, based on determining that the first MST is the security data determining the digital door lock apparatus, a second MST signal generated based on the digital card key information through the MST module so as to unlock the digital door lock apparatus, and
   wherein the security data comprises access authorization information and identification information of the digital door lock apparatus.

2. The electronic device of claim 1, wherein the instructions are configured to cause the processor to repeatedly transmit the second MST signal through the MST module on the basis of a period (T).

3. The electronic device of claim 1, wherein the instructions are configured to cause the processor to repeatedly transmit the second MST signal and a reversed signal of the second MST signal in an alternating way on the basis of a period (T).

4. The electronic device of claim 1, wherein the instructions are configured to cause the processor to output a first user interface for setting an access period on the display, transmit an approval request for the access period set by a user input to the external device, receive the access authorization information according to user authentication and approval from the external device, and store the digital card key information based on the access authorization information.

5. The electronic device of claim 4, wherein the instructions are configured to cause the processor to perform, upon receiving an update request for the access period, a re-approval procedure through communication with the external device, and update the digital card key information based on digital card key information received through the re-approval procedure.

6. The electronic device of claim 4, wherein the instructions are configured to cause the processor to output a payment user interface for receiving payment information in response to an access request, and transmit a payment signal for paying a fee corresponding to the access request to the external device according to payment information input by a user through the payment user interface.

7. A method for unlocking a digital door lock apparatus using an electronic device, the method comprising:
   transmitting a request for digital card key information for unlocking the digital door lock apparatus to an external device;
   receiving security data used for electrical triggering of the digital door lock apparatus and digital card key information from the external device in response to the request;
   detecting an activation request for a magnetic stripe transmission (MST) module;
   transmitting a first MST signal generated based on the security data to the outside through the MST module according to activation of the MST module; and
   transmitting, based on determining that the first MST is the security data authenticating the digital door lock apparatus, a second MST signal generated based on the digital card key information through the MST module so as to unlock the digital door lock apparatus,
   wherein the security data comprises access authorization information and identification information of the digital door lock apparatus.

8. The method of claim 7, wherein transmitting the MST signal to the outside comprises one of:
   repeatedly transmitting the second MST signal on the basis of a period (T); or
   repeatedly transmitting the second MST signal and a reversed signal of the second MST signal in an alternating way on the basis of the period (T).

9. The method of claim 7, further comprising, after transmitting the MST signal to the outside:
   detecting a user input for requesting an access authorization information update;

performing, in response to the user input, a re-approval procedure through communication with the external device; and updating the digital card key information based on new information received through the re-approval procedure.

10. The method of claim 9, further comprising, after transmitting the MST signal to the outside:

outputting a payment user interface for receiving payment information; and transmitting payment information inputted through the payment user interface to the external device to perform a payment function.

11. A digital door lock apparatus comprising:

a trigger circuit configured to cause physical triggering by a magnetic card;

a magnetic stripe transmission (MST) receiver circuit configured to receive an MST signal;

a low-power processor including a wakeup circuit electrically connected to the MST receiver circuit and the trigger circuit; and a memory, wherein the memory stores instructions that cause the low-power processor to control:

receiving a first MST signal transmitted from an electronic device through the MST receiver circuit, determining whether the first MST signal is authenticated data corresponding to the digital door lock apparatus, activating, when the first MST signal is the authenticated data, the wakeup circuit in response to electrical triggering caused by reception of the first MST signal, receiving a second MST signal transmitted from the electronic device, determining whether the received second MST signal includes a digital card key information of the digital door lock apparatus, and unlocking, when the second MST signal includes the digital card key information corresponding to the digital door lock apparatus, the digital door lock apparatus, and wherein the authenticated data comprises access authorization information and identification information of the digital door lock apparatus.

\* \* \* \* \*